Patented Aug. 12, 1941

2,252,317

UNITED STATES PATENT OFFICE 2,252,317

REFRACTORY BUILDING MATERIAL

Victor Moritz Goldschmidt, Holmenkollen per Oslo, Norway

No Drawing. Application February 10, 1937, Serial No. 125,141. In Austria February 20, 1936.

14 Claims. (Cl. 106—59)

The present invention relates to the manufacture of building materials, especially refractory materials, which contain magnesium orthosilicate. For the manufacture of such building materials one has hitherto preferably used natural products which are rich in magnesium orthosilicate such as olivine, olivine rocks and the like. The manufacture in most cases has been made with addition of reactive substances rich in magnesium oxide, for instance caustic magnesium oxide; the amounts of such additions being such that they were sufficient for the transformation of magnesium hydrosilicates into orthosilicate, of iron compounds into magnesium ferrite, for the saturation of uncombined silica—or silica liberated during the process of burning—as magnesium orthosilicate, and that eventually some minor excess of free magnesium oxide remained in the finished products. It is also known to incorporate other substances into the raw materials rich in magnesium orthosilicate, such substances being for instance compounds of chromium, of iron, of aluminium or others. Furthermore it is also already known to use the raw materials rich in magnesium orthosilicate, partly as granular material, partly as finely powdered material.

With regard to this last point one has hitherto worked in such a manner that the fine material consisted dominatingly, or of an essential part, of magnesium orthosilicate, for instance as olivine, or of substances which are able to form magnesium orthosilicate during the process of burning, whereas other substances such as caustic magnesium oxide also might be present in the fine materials. The manufacture generally has been made in such a manner, that the olivine material, which has been crushed in usual manner, has been used including its contents of finely powdered materials, which is always about 35–45 per cent of the total olivine batch, or under addition of other substances such as caustic magnesium oxide and the like, or one has separated the finely powdered olivine from the granular material, has milled it together with other substances, such as caustic magnesium oxide, eventually under addition of further amounts of substances containing magnesium silicates, and then one has mixed these fine materials, rich in magnesium orthosilicate and eventually other magnesium silicates with the granular material, to form a batch for manufacture.

It has now been found, that one can manufacture building materials rich in magnesium orthosilicate which have especially valuable properties, if the magnesium orthosilicate or the raw material rich in magnesium orthosilicate is used exclusively or nearly exclusively as coarser particles (granular to coarsely granular) and composes a batch comprising this granular material combined with a finely disintegrated material which consists of refractory or highly refractory substances of other types, preferably such as magnesium oxide, substances containing chromium, mixtures of such two kinds of substances, or substances containing both magnesium and chromium. This finely divided material does not contain magnesium orthosilicate, nor substances which are able to form magnesium orthosilicate from components of the finely powdered material, or which contains magnesium orthosilicate or substances able to form magnesium orthosilicate only in subordinate harmless amounts.

As a coarse material one can use natural products rich in magnesium orthosilicate, as for instance olivine minerals, especially olivine poor in iron, olivine rocks, olivine sand, olivine serpentine rocks, further one can use for the production of the granular coarse material magnesium orthosilicate which has been produced synthetically, or products rich in synthetic magnesium orthosilicate. For products which shall be used at very high temperatures, preferably very pure olivine rocks, poor in iron, are to be used. Olivine rocks containing such impurities as serpentine or pyroxenes may be used where high mechanical strength is needed at intermediate temperatures. The grains, which preferably shall be sharply angular, can for instance have diameters of between about 0.2 and 20 mm. for instance between 0.3 and 8 mm., preferably between about 0.3 and 4.0 or 6.0 mm. The raw materials which contain considerable percentages of magnesium hydrosilicates, such as for instance serpentine, conveniently may be treated preliminarily by such means as calcining, roasting or sintering. By means of calcining or roasting the granular material one can obtain surface conditions of the granules which are favourable for the cementing of the particles by means of binders, as the surface becomes coated by products of oxidation of iron compounds contained in the raw material. If the raw material is sintered before disintegration, one promotes the formation of sharp angular particles in the subsequent process of crushing.

By heating of magnesium hydrosilicates such as, for instance, serpentine, rocks rich in serpentine and the like, in presence of substances rich in magnesium, such as magnesium oxide, one can produce magnesium orthosilicate synthetically and one can use such synthetic products as the granular or coarsely granular components of a batch according to the present invention.

The process of disintegration of the raw materials rich in magnesium orthosilicate preferably is made in such a manner, that the percentage of finely powdered materials becomes as low as possible, a result which can be secured for instance by stepwise disintegration between steel rollers. From the crude disintegrated material, the fine particles have to be eliminated by suitable means, as for instance by sifting. Small amounts of fine particles, amounts being so small that they do not essentially deteriorate the products, may eventually be left with the granular material. By means of sifting one can also collect special gradings of grain sizes of the granular material and one can manufacture products from single grades of granular materials or from combinations of different grades. For instance one can crush olivine rocks between steel rollers down to a maximum size of 6 mm., then one can by means of sifting eliminate any particles which are smaller than 0.3 mm., and one can use the total amount of sizes between 0.3 and 6 mm. as coarse granular material. In other cases one can differentiate this material by means of sifting into different grades of particle sizes, for instance the following ones:

A. 6—3 mm.
B. 3—1 mm.
C. 1—0.5 mm.
D. 0.5—0.3 mm.

Then one can for one batch use mixtures of grades A and C, and for a second batch mixtures of B and D, for instance in proportions of A:C and B:D of 2:1 to 3:1, and one can use these two batches of coarse material in combination with suitable amounts of the fine material necessary in accordance with the present invention, for instance in a proportion of 2 parts by weight of granular material to 1 part of finely powdered material.

As a fine material one uses refractory substances other than magnesium orthosilicate, suitably such substances, which are as resistive as possible against chemical agents, such agents are for instance slags, molten substances, gases. Suitable refractory substances are especially sintered magnesite, dead burned magnesite, fused magnesium oxide, or corresponding crystalline magnesium oxide, made by chemical processes, furthermore chromium compounds or substances containing chromium compounds. Very good results have been obtained by the use of, for instance, compounds of chromium and oxygen, especially chromites, preferably such chromites which contain magnesium oxide, such as natural or synthetic chromium spinel, such chromium spinels being not only the pure compound $MgCr_2O_4$, but also the solid solutions of this compound with the substances $MgAl_2O_4$, $MgFe_2O_4$, $FeCr_2O_4$ and $FeAl_2O_4$. Furthermore such substances as chromium sesquioxyde ($Cr_2O_3$) are suitable. Compounds and substances of the kind last mentioned suitably are used in mixtures together with magnesium oxide, for instance with burned magnesite. By this means one can provide the formation of chromium spinels in the amounts desired through the process of burning. Corresponding to the proportions chosen for the components of the fine material the products of reaction through burning may either consist essentially of $MgCr_2O_4$, or they may contain besides that compound also uncombined MgO or $Cr_2O_3$, respectively uncombined MgO or $Cr_2O_3$ entering into solid solution into the chromium spinel or into spinels containing chromium. If a finely divided material is being used which consists of $FeCr_2O_4$ and MgO one can obtain through the process of burning spinels of the formula $Mg(Cr,Fe)_2O_4$, according to the reaction:

$$6\ MgO + 4\ FeCr_2O_4 + O_2 = 6\ Mg(Cr,Fe)_2O_4$$

Chromium compounds can also be incorporated into the fine material as slags which are rich in chromium, such as waste products from the manufacture of ferro-chromium. Likewise one can use inexpensive chrome ores, which may be rather impure, for instance containing 5–15% $SiO_2$, which can be used after eventually being calcined or sintered. In using such impure chrome ores or chrome slags, however, one ought to take care that the percentages of $SiO_2$, combined or uncombined, shall not exceed an amount of 3 to 10 percent by weight of the fine material, in order to avoid the formation of objectionable amounts of $Mg_2SiO_4$ in the fine material during the process of burning.

The fine material can contain instead chromium compounds or eventually instead of chromium compounds also refractory compounds of iron, or substances which can form refractory compounds of iron. For instance one can form the sipnel $MgFe_2O_4$, magnesium ferrite, by using a mixture of $Fe_2O_3$ and MgO and by burning this material.

Generally excellent results have been obtained if the substantial components of the finely divided material are constituents of such refractory spinels which contain substantially the oxides of magnesium and of at least one of the typical trivalent metals of the iron family, that are chromium and iron.

The fine material may contain also other refractory substances such as for instance zirconium oxide, zirconium silicate and the like. Suitably one uses additions of such substances only in subordinate amounts, such as for instance only 5 or 10 percent by weight of the fine material. In many cases also an addition of small amounts, for instance 0.2 to 3 percent by weight, of very hard substances has been found to be of advantage, such substances have to be chosen, which are harder than olivine, such as for instance carbide of silicon, corundum and similar substances. Likewise it may be of advantage to incorporate small amounts of mineralizers such as fluorides into the fine material.

If a fine material is being used which consists of refractory magnesium compounds and of chromium compounds, such as for instance chromium sesquioxide or chromites, for instance chrome ores, it is recommendable, before making the batch, to effectuate the disintegration of the components of the fine material by milling them jointly, not separately. For instance one can use a ball mill to secure at the same time a very intimate mixture and a subdivision into particle sizes less than 0.2 mm. or even essentially less than 0.1 mm. in order to secure as completely as possible the chemical reactions between the components of the fine materials during the subsequent process of burning of the product. The proportions between magnesium oxide and chromium compounds in such a fine material can vary between wide limits. The proportion between MgO and ($Cr_2O_3+Fe_2O_3+$ eventually $Al_2O_3$) in the fine material may vary between about 6:1 and 1:6 by weight. Very satisfactory products have been manufactured using proportions between about 2:1 and 1:2, and excellent results are being obtained using a proportion of about 1:1 by weight, the MgO thus being in excess of the theoretical spinel formula MgR$_2$O$_4$, where R designs a trivalent metal. If one uses a finely powdered material which contains chromiferous substances which are able to form spinels by reaction with magnesium oxide one can use caustic magnesite in addition to, or instead of, dead burned magnesite as a constituent of the fine material.

According to the present invention the fine material shall not contain, or shall practically not contain, magnesium orthosilicate, substances rich in magnesium orthosilicate such as olivine, nor substances which are able to form magnesium orthosolicate by means of chemical reactions between the constituents of the fine material during burning, such as for instance serpentine in the presence of magnesium oxide. At any case the fine material shall contain such constituents only in subordinate amounts which are so small, that they do not give harmful effects or only very slight harmful effects. According to investigations made by the inventor, the percentage of such substances in the fine material shall not exceed 25 per cent by weight, preferably not more than 10 per cent of the fine material. In these maximum percentages are also included those amounts of finely divided magnesium orthosilicate which have their origin from such fine particles of olivine and the like which may have contaminated the granular material of the batch. It is therefore very important to eliminate such particles from the granular material before incorporating the granular material into the batch.

It may be mentioned that small amounts of magnesium orthosilicate may be formed in the fine material during the process of burning by reactions between silicon compounds from the granular material and magnesium oxide from the fine material.

One should avoid incorporating into the batch large amounts of substances which are able to form easily fusible slags with magnesium orthosilicate, such as fireclay, china clay and the like; such substances only can be used in limited amounts as bonds or fluxes of the fine material. For instance fire clay should not be added in amounts which exceed for instance 5 per cent by weight or 10 per cent by weight of the finely powdered material.

The particle size of the fine material generally should not exceed a particle diameter of 0.2 mm. Suitably the bulk of the fine material should have a particle size less than 0.1 mm., eventually partly down to 0.005 mm., or down to the dimensions of colloidal particles.

As bonds one can use inorganic substances, such as caustic magnesium oxide, clay, bentonite, magnesium chloride, alkali silicate, or solutions of organic substances, such as cellulose waste liquor, molasses, solutions of dextrine, solutions of gums, or eventually a combination of several such inorganic and organic substances. These bonding substances suitably are to be used only in small amounts, for instance in such amounts, that the percentage of dried bonding substances shall not exceed 5 per cent by weight of the whole batch. Caustic magnesite as a binder, however, can be used also in larger amounts, especially in the presence of large amounts of fine material which contains chromium or iron. Caustic magnesite improves the cold set of the building material, making possible the shipment of unburned bricks.

The manufacture of moulded bodies is made by methods known to those experienced in the art, that a batch, consisting of a mixture of a coarse material as mentioned above and fine material as mentioned above after incorporation of bonding materials and after being moistened with water or suitable organic liquors is moulded into bodies of desired shape, and by consolidating such bodies, if necessary, by means of a process of burning.

By means of well known methods, such as use of pressure, ramming, casting and the like, the batch can be worked up into bodies of a shape desired. During such processes of moulding one has to avoid further crushing of the coarse grains as far as practically possible. The process of burning can be made at temperatures between 1200° C. and 1600° C., or if desired also at higher temperatures, in oxidizing atmosphere or in reducing atmosphere, or in neutral atmosphere, or eventually also in alternatingly oxidizing and reducing atmosphere. The burning of ramming masses or of monolithic furnace linings and similar objects may be effected through the use or through the firing of the furnaces in which the material shall be applied. Through the process of burning the coarse particles, for instance the olivine, are cemented by the fine material or by the products which are formed through burning of the fine material. From the mixture of finely divided calcined magnesite, for instance sinter magnesite, and of finely divided refractory compounds of chromium and eventually iron refractory spinels are formed through the process of burning. In thin sections or on polished surfaces of satisfactorily burned products such spinels are seen to constitute an apparently homogeneous, coherent cementing mass, of brown or black colour, in which mass the grains of burned olivine are imbedded. The spinels seem to take up into solid solution such components which are in excess to the spinel formula and possibly also some silica. In some cases the spinels are seen to be distinctly coarsely crystalline. An excess of uncombined MgO is present in products rich in magnesia.

The present invention makes possible the manufacture of building materials which have excellent mechanical properties, especially also at high temperatures and which likewise are very resistant against destructive chemical processes, such as corrosion by means of slags or gases, and one is able to adapt the properties of the product to various demands, corresponding to different fields of uses, by means of suitable selection of the raw materials, especially by means of the composition of the fine material, and by means of the proportions between coarse material and fine material.

According to the present invention one can manufacture products, the under load softening temperature of which is about 80 degrees centigrade or even 150 degrees centigrade higher than the softening temperature of known building materials which contain magnesium orthosilicate as a main constituent; also the resistiveness of the building material against sudden change of temperatures, for instance against quenching from 1000° C. down to room temperature by means of cold air blast is essentially improved as compared with known magnesium orthosilicate materials, the number of quenchings from 1000° C. until failure being for instance three times as many. Furthermore the products manufactured according to the present invention show a marked improvement with regard to thermal shrinkage, even if exposed to very high temperatures for a very long time, as for instance in the roofs of reverberator furnaces. With regard to chemical properties the products which are manufactured according to the present invention are characterized by very remarkable resistiveness against attacks of slags, or attacks of fused salts, or against attacks of gaseous agents, and they are also very resistive against damage by fusing through contact with other refractories at high temperatures.

In order to obtain very good resistiveness against load at very high temperatures, for instance 1400° C.–1800° C., it is recommendable to use a relative high proportion of the coarse material rich in magnesium orthosilicate. In such cases the percentage by weight of the coarse material can be, for instance, 50–75 percent by weight of the entire dry substance of the batch, eventually even more, such as up to 80 or 85 percent by weight. Excellent results have been obtained especially by using about 60–70 percent by weight of the coarse material. However, one can obtain very good results even by using lower amounts of coarse material, for instance 40–50 percent by weight.

In some cases one can incorporate also subordinate amounts of other granular refractory substances besides the coarse material of magnesium orthosilicate, such as, for instance, granular or coarsely granular material rich in chromium compounds. The particle sizes of such additions may be the same as those of the coarse material of magnesium orthosilicate.

If one uses sintered magnesium oxide, for instance sintered magnesite, as a constituent of the fine material, one can, for instance, use such proportions of raw materials that the finished, burned products still contain considerable amounts of free uncombined magnesium oxide or of magnesium oxide which is not combined with silica. The percentage of such magnesium oxide in the finished products may for instance be as low as 5 percent by weight of the total building material, or for instance 10–50% or preferably 10–25%. In the finished products there may be for every 100 parts of magnesium silicates about 10–100 parts by weight of magnesium oxide which is not combined with silica.

Examples

1. Olivine rock, which contains 90% olivine (the olivine contains 7% FeO) and as further constituents talc and serpentine, is disintegrated into grain sizes 1–10 mm., particles smaller than 1 mm. being eliminated by sifting. 75 parts by weight of this coarsely granular material are mixed with 25 parts by weight of finely subdivided material which contains 20% caustic magnesite and 80% chrome ore (with 45% $Cr_2O_3$), the particle size of the magnesite and the chromite being less than 0.1 mm., with the addition of about 2% of binding clay and 6% of a solution of cellulose waste liquor (all percentages referring to the total weight of the building material), the mixture being carefully made uniform. A part of the fine material can be disintegrated unto a fineness of 0.005 mm. particle diameter, or even down to the fineness of colloids, in order to give a better plasticity. The mass is worked up into moulded bodies, for instance bricks, and these then are to be burned at 1200–1550° C., preferably 1450° C. The same batch can also be used as a ramming mass.

2. Olivine rock, containing 90% olivine poor in iron, 3% talc, 8% serpentine, 1% chromite, is crushed into grain sizes between 0.5 and 3 mm., any finer particles than 0.5 mm. being eliminated by sifting. One mixes 60 parts of this granular olivine material with 40 parts of a fine material, containing 66 parts of $Cr_2O_3$, 30 parts of caustic magnesite and 4 parts of binding clay. The batch is moistened with a diluted aqueous solution of waste cellulose liquor, is moulded under a pressure of 200 kg./cm.$^2$, is dried and is fired in an oxidizing atmosphere for instance between 1350°–1600° C. If there is used less granular material and more fine material, for instance 50% granular material and 50% fine material, the pressure of moulding advantageously can be increased, for instance up to 500–1000 kg./cm.$^2$ 3. Olivine rock, containing 88 parts by weight of olivine (with 8% FeO), 7 parts of talc, 3 parts of serpentine, 1 part of diopside, 1 part of chromite, is disintegrated into a granular material, the largest grains of which do not exceed 12 mm., while the material smaller than 0.4 mm. is eliminated by sifting, or by means of pneumatic classifiers, eliminating in the same operation also most of the talc. Eventually one eliminates also material of intermediate grain sizes, in order to obtain as dense a packing as possible of the granular particles. 65 parts by weight of such an olivine granular material are to be mixed with 35 parts by weight of a fine material which consists of a finely disintegrated mass having the following constituents: 33% by weight of sintered magnesite, 67% of chrome ore (containing 39% $Cr_2O_3$, 12% $Al_2O_3$, 26% oxides of iron, 16% MgO, 5% $SiO_2$, 2% $H_2O$). To this batch is incorporated 1–2% of binding clay or of bentonite, further a suitable amount of a diluted aqueous solution of dextrine; the batch can be used as ramming mass or can be moulded into bricks.

4. An olivine rock, containing 93% olivine (with 6% FeO), 4% enstatite and 2% chromite, is disintegrated and sifted to give a grading of grain sizes between 0.5 and 12 mm. or grain sizes between 2 and 14 mm. As fine material there is used a mixture of about 30–50 per cent by weight of sintered magnesite milled jointly with 70–50 per cent by weight of chromium sesquioxide, $Cr_2O_3$ (maximum particle size 0.1 mm.). The fine material can eventually contain also subordinate amounts, for instance 5–15% of finely milled caustic magnesite. The chromium sesquioxide can also be substituted partly, eventually up to 50% of the fine material, by the less expensive chrome ore. The mixture of granular material and fine material can, for instance, have the following composition: 70% granular material of olivine rock, 13% $Cr_2O_3$, 13% sintered magnesite, 4% caustic magnesite. To this batch one can add small amounts, advantageously less than 5%, of inorganic or organic binders and eventually also small amounts of mineralizers, for instance sodium fluoride or magnesium fluoride. The batch can for instance be moistened with a 2% solution of magnesium chloride, then for instance be moulded under pressures of about 50–110 kg./cm.$^2$, and is burned at temperatures between 1200 and 1600° C., eventually using alternatingly oxidizing and reducing atmosphere.

Instead of the olivine rock mentioned above, one can use synthetic magnesium orthosilicate which has been manufactured according to well known methods, for instance by sintering or melting processes, and which may contain for instance about 90 per cent by weight of $Mg_2SiO_4$, 4% $Fe_2SiO_4$ and 6% $MgSiO_3$, or one can use pure synthetic $Mg_2SiO_4$.

5. One uses an olivine rock (dunite) containing 85 per cent by weight of olivine (the olivine containing 6-7% FeO), 5% enstatite, 10% serpentine. The rock is calcined or sintered and is then disintegrated into the particle size desired, for instance such that the largest grains have a diameter of 4 mm. Any fine particles, which have diameters less than 0.5 mm. are eliminated by means of sifting. The grading of the remaining, granular material may be the following one:

24 per cent by weight with particle sizes between 0.5 and 1 mm.
21 per cent by weight with particle sizes between 1 and 2 mm.
18 per cent by weight with particle sizes between 2 and 3 mm.
36 per cent by weight with particle sizes between 3 and 4 mm.

For use as a fine material one uses a mixture of 48 per cent by weight (per cent of the weight of the fine material) chrome ore (containing 36-50% $Cr_2O_3$), 32 per cent by weight of sintered magnesite, 15 per cent by weight of caustic magnesite and 5 per cent by weight of a suitable flux, for instance china clay. This mixture is milled, for instance in a ball mill, until all particles are smaller than 0.2 mm. and until 80% by weight of the fine material has a particle size less than 0.08 mm.

Instead of the dunite rock, mentioned above, one can also use a coarsely granular material which is more rich in calcination products of hydrosilicates, for instance olivine rocks containing up to about 20 per cent by weight of serpentine. Such materials ought to be calcined or even sintered prior to disintegration.

With regard to the amount of fluxes which are added to the fine material or to the batch one is not limited to the said amount of 5 per cent of the fine material, as the products which are being manufactured according to the present invention are much more resistant against destructive effects of fluxes and slags as compared with the known olivine refractories.

In order to prepare a batch from the materials mentioned in this example one composes the batch of 100 parts of the granular material rich in olivine and of 50-100 parts of the fine material, preferably 40-60 parts of the fine material. It is to be recommended that a relatively large amount of fine material is to be incorporated if the coarse material is relatively rich in hydrosilicates, such as serpentine, talc or chlorite. In such cases one may use, on every 100 parts by weight of coarse material about 60-100 parts of fine material. If the amount of hydrosilicates in the granular material is relatively low, for instance not higher than 10 per cent by weight of the coarse material, one may preferably use only 40-60 parts by weight of fine material on every 100 parts of coarse material.

The mixture of coarse and fine material is moistened with 6 per cent by weight of a solution of 80 grams $MgCl_2$ per 100 grams of water, the addition of this solution being made either to the mixed batch or to one of the components of the batch, preferably to the coarse material, before mixing, or during the process of mixing.

From the batch one can manufacture moulded products, such as bricks, or one can make ramming masses, spattered masses, monolithic linings, to be used at high temperatures, eventually after being consolidated by a process of burning at high temperatures, even up to temperatures near the softening temperature of the products.

Products manufactured according to the present invention have a very broad range of application. For instance they may be used for metallurgical furnaces, tunnel kilns, cement kilns, also rotary cement kilns, furnaces for the distillation of coal (coking furnaces), forging furnaces, reverberatory furnaces, etc.

I claim:
1. Refractory comprising about 50 to about 80 per cent by weight of material of the group consisting of magnesium orthosilicate and materials rich in such silicate substantially wholly in the form of granules of at least about 0.2 mm. size, and about 20 to about 50 per cent by weight of refractory material other than said silicate in the form of particles less than about 0.2 mm. size and containing not over about 25 per cent of said orthosilicate and materials productive of it, the refractory being characterized by high resistance to spalling and to load at high temperatures in the fired or burned condition.

2. Refractory according to claim 1, said material in the form of particles less than about 0.2 mm. size containing less than about 10 per cent of magnesium orthosilicate and material productive thereof.

3. Burned refractory comprising about 50 to about 80 per cent by weight of material of the group consisting of magnesium orthosilicate and materials rich in it substantially wholly in the form of granules at least about 0.2 mm. in diameter, and about 20 to about 50 per cent by weight of at least one material of the group consisting of (1) refractory spinels composed chiefly of magnesia and at least one oxide of a metal of the group consisting of iron and chromium, and (2) materials productive of such spinels, substantially wholly in the form of particles less than 0.2 mm. in diameter and substantially free from said orthosilicate, the refractory being characterized by high resistance to spalling and to load at high temperatures.

4. Burned refractory in accordance with claim 3, said material in the form of particles less than 0.2 mm. in diameter consisting principally of crystalline magnesium oxide.

5. Burned refractory shapes comprising from about 50 to about 80 per cent by weight of material of the group consisting of magnesium orthosilicate and materials rich in such silicate substantially wholly in the form of granules of at least about 0.2 mm. diameter, and from about 20 to about 50 per cent by weight of a mixture of magnesia and chrome ore substantially wholly in the form of particles less than 0.2 mm. in diameter and substantially free from said orthosilicate and materials productive of it, the refractory being characterized by high resistance to spalling and to load at high temperatures.

6. Burned refractory shapes comprising from about 50 to about 80 per cent by weight of material of the group consisting of magnesium orthosilicate and materials rich in such silicate substantially wholly in the form of granules of at least about 0.2 mm. diameter, and about 20 to about 50 per cent by weight of a cementing mass composed of bonded particles of material less than about 0.2 mm. diameter size of the group consisting of chrome-magnesia spinel and materials productive of said spinel, said cementing mass containing magnesia in excess of that corresponding to said spinel ratio.

7. Burned refractory shapes comprising from about 50 to about 80 per cent by weight of olivine substantially wholly in the form of granules at least 0.2 mm. in diameter, and about 20 to about 50 per cent by weight of cementing mass composed of bonded particles of material substantially wholly in the form of particles less than 0.2 mm in diameter and selected from the group consisting of (1) spinel composed largely of magnesium oxide and chromium oxide, and (2) materials productive of said spinels 8. Burned refractory shapes comprising substantially about 60 to 70 per cent by weight of olivine granules coarser than about 0.2 mm. diameter, and about 40 to 30 per cent of a mixture of magnesium oxide and chrome ore particles finer than about 0.2 mm. diameter.

9. Burned refractory shapes consisting of about 60 to 70 per cent by weight of olivine granules coarser than 0.2 mm. diameter, and about 40 to 30 per cent by weight of a mixture of substantially equal parts by weight of dead burned magnesite and chrome ore substantially wholly in the form of particles finer than about 0.2 mm. diameter.

10. That method of making refractory which comprises providing a material of the group consisting of magnesium orthosilicate and materials rich in such silicate in a form consisting essentially of granules having a diameter of at least about 0.2 mm., preparing a batch containing from about 50 to about 80 per cent by weight of said material, and about 20 to 50 per cent by weight of material selected from the group consisting of (1) refractory spinels composed chiefly of magnesia and at least one oxide of a metal of the group consisting of iron and chromium, and (2) materials productive of said spinels, and substantially free from said silicate and materials productive of it, subdivided to have a particle size less than 0.2 mm., and preparing shapes from said batch.

11. That method of making refractory which comprises providing olivine in a form consisting essentially of granules having a diameter of at least about 0.2 mm., preparing a batch containing from about 50 to about 80 per cent by weight of said olivine, and from about 50 to 20 per cent by weight of at least one material selected from the group consisting of magnesia and chrome ore substantially free from said silicate and subdivided to have a particle size not over about 0.2 mm., preparing shapes from said batch, and firing the formed shapes.

12. A refractory batch comprising about 50 to about 80 per cent by weight of material of the group consisting of magnesium orthosilicate and materials rich in it substantially wholly in the form of granules at least about 0.2 mm. in diameter, and about 20 to about 50 per cent by weight of at least one material of the group consisting of (1) refractory spinels composed chiefly of magnesia and at least one oxide of a metal of the group consisting of iron and chromium, and (2) materials productive of such spinels, substantially wholly in the form of particles less than 0.2 mm. in diameter and substantially free from said orthosilicate.

13. A refractory batch comprising about 50 to about 80 per cent by weight of material of the group consisting of magnesium orthosilicate and materials rich in such silicate substantially wholly in the form of granules of at least about 0.2 mm. diameter, and from about 20 to about 50 per cent by weight of a mixture of magnesia and chrome ore substantially wholly in the form of particles less than 0.2 mm. in diameter and substantially free from said orthosilicate and materials productive of it.

14. An unburned refractory article comprising about 50 to about 80 per cent by weight of material of the group consisting of magnesium orthosilicate and materials rich in such silicate substantially wholly in the form of granules of at least about 0.2 mm. size, and about 20 to about 50 per cent by weight of refractory material other than said silicate in the form of particles less than about 0.2 mm. size and containing not over about 25 per cent of said orthosilicate and materials productive of it, the refractory being characterized by high resistance to spalling and to load at high temperatures in the fired or burned condition.

VICTOR MORITZ GOLDSCHMIDT.